Figure 1:
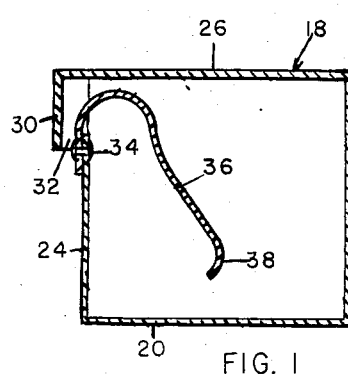

United States Patent [19]

Sedlacek

[11] Patent Number: 4,696,744
[45] Date of Patent: Sep. 29, 1987

[54] COFFEE FILTERS AND DISPENSER CONTAINER THEREFOR

[76] Inventor: Raymond Sedlacek, P.O. Box 41, Flagler Beach, Fla. 32036

[21] Appl. No.: 822,819

[22] Filed: Jan. 27, 1986

[51] Int. Cl.[4] .................. B01D 27/06; B01D 27/08
[52] U.S. Cl. .................. 210/387; 210/493.4; 210/493.5
[58] Field of Search .............. 221/26, 30, 32, 45, 221/48, 71, 119, 121, 122, 167; 99/279, 291, 298, 304, 306; 210/387, 474, 477, 479, 481, 493.1, 493.5, 493.4

[56] References Cited

U.S. PATENT DOCUMENTS

| 3,462,043 | 8/1969 | Frick | 221/48 |
|---|---|---|---|
| 3,490,645 | 1/1970 | Glass et al. | 221/48 |
| 3,994,417 | 11/1976 | Boedecker | 221/48 |
| 4,066,185 | 1/1978 | Thompson | 221/26 |
| 4,416,392 | 11/1983 | Smith | 221/45 |
| 4,453,649 | 6/1984 | Origuchi | 221/26 |
| 4,592,840 | 6/1986 | Brooks | 210/387 |
| 4,595,502 | 6/1986 | Himmelsbach | 210/493.5 |

FOREIGN PATENT DOCUMENTS

| 8101850 | 11/1982 | Netherlands | 221/26 |
|---|---|---|---|
| 181145 | 6/1922 | United Kingdom | 221/26 |

Primary Examiner—Richard V. Fisher
Assistant Examiner—Wanda L. Millard
Attorney, Agent, or Firm—John A. Hamilton

[57] ABSTRACT

Coffee filters formed by longitudinally spaced segments of a continuous tape of filter paper, connected by intact strips of said paper, the tape being rolled longitudinally to permit large numbers of said segments to be stored in a small space. The tape may be paid out from the roll and torn or otherwise separated from the tape for individual use. Each individual segment is provided with fold lines facilitating its formation into cup form, after separation from the tape, as required for use in most coffee making machines. Also provided is a dispenser container for the filter paper roll, the container being configured to permit easy, one-at-a-time dispensing of the tape segments, and to prevent damage to the tape during dispensation.

1 Claim, 5 Drawing Figures

U.S. Patent
Sep. 29, 1987
4,696,744

COFFEE FILTERS AND DISPENSER CONTAINER THEREFOR

This invention relates to new and useful improvements in coffee filters, and has particular reference to a novel form in which they may be more compactly packaged for easier and more economical storage and shipping, and to a container also providing for compact shipping and storage, and from which the filters may be conveniently dispensed one at a time for actual use.

A coffee filter for use in coffee making machines usually constitutes a circular blank of filter paper formed in a cup shape, usually with the side walls of the cup shape in an accordian pleated or fluted form, the filter being adapted to be fitted into the filter holder of a coffee machine to receive ground coffee or coffee granules therein in the coffee making process. In manufacture, said filter cups are usually tightly and snugly nested into stacks of varying heights, and the stacks then boxed for sale. This type of filter and package has certain disadvantages. The boxes or other containers must be relatively large to contain relatively small numbers of the filters in their cup form, which is wasteful of storage and shipping space. Also, the filter cups, when tightly and snugly nested as described, are often quite difficult to separate, with the result that the person ultimately using the filter sometimes places more than one filter in the coffee making machine. This is also wasteful, and moreover affects the rate of filtration and produces coffee of an inferior quality. The present invention contemplates means and arrangements by which both of these common and well known difficulties are overcome.

Accordingly, one more specific object of the present invention is the filter units not be produced separately, but in the form of a continuous tape of filter paper consisting of a series of generally circular segments with successive segments joined only by a narrow connecting portion of the tape at their contiguous edges. Each segment is formable into a filter cup when separated from the remainder of the tape. When said tape is snugly rolled in cylindrical form, it will be obvious that the resulting "bundle" may contain a large number of the filter segments in a very small space. The tape may be divided between the individual segments by perforated tear lines or the like, to provide easy separation of the segments.

Another object is the provision of a filter tape of the character described in which each circular segment thereof is provided with fold lines along which it can fold easily, the fold lines being so arranged that when the segment is separated from the remainder of the tape and pressed downwardly into the filter holders of a coffee making machine, it will easily and virtually automatically be formed to the desired cup shape.

A further object is the provision of a dispenser box well adapted to contain the tape roll above described rotatably therein, and from which the tape may be withdrawn through a narrow opening thereof.

A still further object is the provision of a dispenser box of the character described which, to compensate for the facts that the filter paper is inherently rather flimsy, and that the lateral edges of the filter tape are rather deeply scalloped due to the circular form of its individual segments, is provided with an insert which not only applies a light braking force to rotation of the tape roll to avoid sudden jerks or uneven pulls on the extended portion of the tape, which could cause breakage or tearing of the paper, but also provides that the emerging tape always approaches a smoothly rounded surface thereof at an acute angle, with no edges which could catch and tear the scallops. Other objects are simplicity and economy of structure, and efficiency and dependability of operation.

Figure 2:
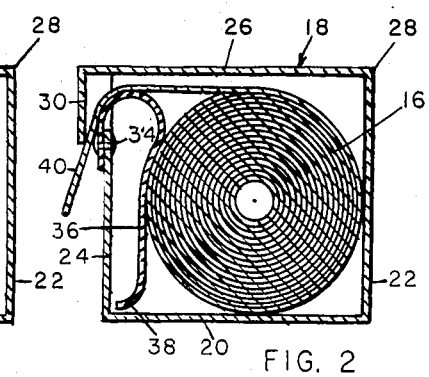
Figure 4:
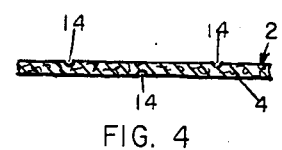
Figure 3:
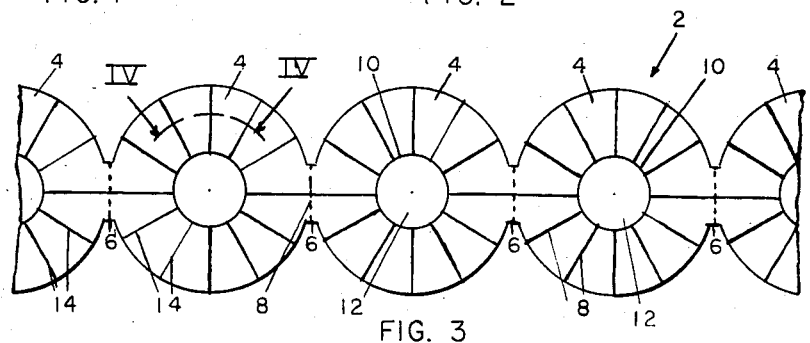
Figure 5:
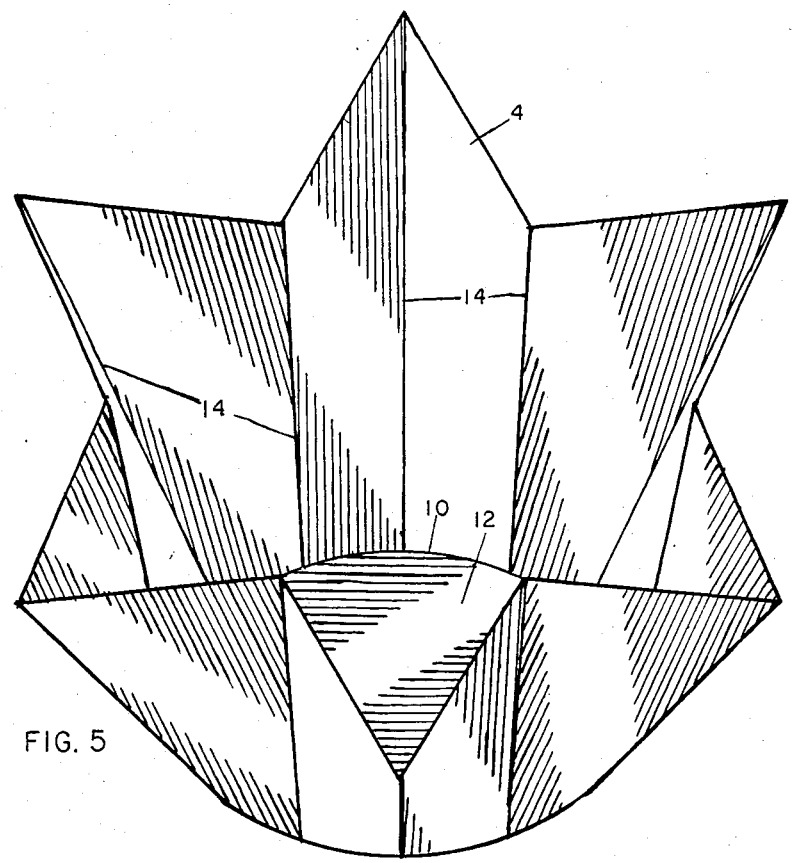

With these objects in view, as well as other objects which will appear in the course of the specification, reference will be had to the accompanying drawing, wherein:

FIG. 1 is a transversely sectional view of a dispenser box forming an element of the present invention, but with no roll of filter paper tape carried therein, FIG. 2 is a view similar to FIG. 1, but with a roll of filter tape mounted therein, FIG. 3 is a face view of a section of the filter paper tape FIG. 4 is an enlarged, fragmentary sectional view taken on line IV—IV of FIG. 3, and FIG. 5 is an enlarged perspective view of one of the segments of the filter paper tape, formed into a cup shape.

Like reference numerals apply to similar parts throughout the several views, and the numeral 2 applies generally to a continuous tape formed of coffee filter paper of any desired charactersitics, as best shown in FIG. 3 and 4. Said tape is cut along its lateral edges to divide it into a series of generally circular segments 4, each successive pair of segments being joined by a relatively narrow strip 6 of the paper left intact along the midline of the tape, generally at the point of tangency between the successive pair of segments. Each of the strips 6 is divided, transversely of the tape, by a line of perforations 8, whereby to form a tear line along which the adjacent segments may be easily and accurately separated by manual force. Each segment 4 has a circular fold line 10 formed concentrically therein but of smaller diameter, and which encloses the area thereof which will form the cup floor 12 when the segment is eventually formed into cup shape, as shown in FIG. 5. The fold line may be formed by deeply indenting the paper, an operation which may be performed by ridges formed on cooperating rollers between which the tape passes during its manufacture, and it eases and facilitates folding of the paper along this line in preference to adjacent portions of the paper. Also, a series of radial fold lines 14 are formed in the paper, extending from circular line 10 to the periphery of the segment, said radial lines being equally spaced peripherally about the segment. The annular portion of each segment 4 between its periphery and circular fold line 10 will form the walls of the cup shape shown in FIG. 5, which will be fluted horizontal form. This configuration requires that fold lines 14 yield in alternately opposite directions, and for this reason it is preferred that said fold lines be formed in alternately opposite sides of the paper, as indicated in FIG. 4. This provides that the fluted configuration will occur more consistently, easily and naturally when the segment is pressed downwardly into the filter holder of a coffee making machine. The tape, as thus described, is rolled longitudinally of itself to form a roll, as indicated at 16 in FIG. 2. The axial length of the roll will be equal to the maximum width of the tape. It will be obvious that in this manner a far greater number of segments 4 may be stored and sold in far less space that would be required for an equal number of preformed filter cups.

For convenience of dispensing the segment 4 one at a time, and also providing greater insurance against accidental damage to said segments as they are dispensed, there is provided a special dispenser container for roll 16, said container being indicated generally by the numeral 18 in FIGS. 1 and 2. Said container has the form of a rectilinear box, formed of cardboard or other suitable material, having a floor 20, rear wall 22, front wall 24, a lid 26, and end walls, not shown, which it will be understood are spaced apart by a distance slightly greater than the axial length of roll 16. The box may be formed of a unitary blank of cardoard or the like, and the corner thereof at the juncture of lid 26 and the upper edge of rear wall 22 constitutes a hinge 28 by means of which the box may be opened to permit the insertion of roll 16. The lid is disposed above the top edge of front wall 24, and is provided at its forward edge with a depending lip 30 spaced forwardly of said front wall, whereby to define therebetween a narrow opening 32 through which tape drawn from roll 16 may exit from the box. Affixed to the upper edge of front wall 24, as by rivets 34, is a filler member 36 constituting a thin sheet preferably formed of thin, resilient metal. As best shown in FIGS. 1 and 2, said filler is riveted at its upper edge to the outer surface of front wall 24, then curves smoothly upwardly and rearwardly into the box, then extends downwardly into the box rearwardly of front wall 24, its extreme lower edge being again curved smoothly forwardly, as indicated at 38. It is of uniform cross-section contour between the ends of box 18, its ends being spaced slightly inwardly from the end walls of the box to permit free motion thereof between said ends. Normally, the insert extends downwardly and rearwardly into the box, as shown in FIG. 1.

In use, it will be seen that filter paper roll 16 may be inserted downwardly into box 18 after lid 26 is opened. The free end 40 of tape 2 from roll 16 is then led forwardly over insert filler 36 and the upper edge of front box wall 24, and the lid closed, so that the tape end emerges through opening 32, as best shown in FIG. 2. The tape segments 4, each of which will form a single filter, may then be dispensed one at a time by pulling on tape end 40. This pays out the tape from roll 16, and rotates said roll within the box. When one full segment has emerged from the box, it may be torn free from the following segment either by pulling it slightly angularly to tear the tape along the perforated line 8 dividing it from the following segment, or by pulling upwardly thereon to bring the connecting strip 6 of the tape against the lower edge of front lip 30 of the box lid, which may serve as a cutting edge. The severed segment, which is then circular but still flat, may be pressed downwardly into the filter holder of a coffee making machine, whereupon the fold lines 10 and 14 thereof will cause it to assume the cup shape shown in FIG. 5 easily and naturally, as desired.

Filler insert 36 has at least two valuable functions. First, the smoothly curved portion thereof at its upper edge insures that the emerging tape will always approach it at a sharply acute angle, with no sharp or abrupt edges which could snag on the scalloped edges of the tape resulting from the generally circular form of its segments. This is extremely important in the handling of filter paper, which is by nature rather flimsy, since such snagging could fold, tear or rumple the edges of a segment 4, and possibly destroy its utility. Second, the filter by its resilience maintains a slight braking of rotation of the roll 16 within the box. This braking effect should not be so severe as to resist rotation of the roll to the extent that normal tension on the tape to withdraw it from the box could cause rupture of the tape, but should be sufficient to prevent "overrun" rotation of the roll whenever withdrawal of tape from the box is halted. Such overrun rotation can develop looseness in the winding of the roll, which greatly increases the chance that the paper will be damaged when it is subsequently pulled to dispense further tape segments. The curvature 38 at the lower edge of the insert provides that no sharp edge thereof can engage the tape roll even when the diameter of the roll is substantially reduced. Of course, if the material of which box 18 is formed is sufficiently strong and resilient, insert 36 could be formed of the same material, being provided by an extra flap forming a part of the blank from which the box is formed.

While I have shown and described a specific embodiment of my invention, it will be readily apparent that many minor changes of structure and operation could be made without departing from the spirit of the invention.

What I claim as new and desire to protect by Letters Patent is:

1. Coffee filters adapted for use in coffee making machines requiring a filter, comprising:

a. a continuous strip of filter paper in the form of an elongated tape shaped to form a series of longitudinally spaced, generally circular segments each configurated to serve as a single filter, said segments being severably connected by relatively narrow connecting strips of filter paper left intact adjacent the center line of the tape, said tape being longitudinally rolled whereby to permit the storage of a large number of said segments in a very small space, said tape being extendable from said roll to enable separation of said segments therefrom one at a time, b. a dispenser container for said roll of filter paper tape, said roll being carried in said container for axial rotation therein, said container having a narrow exit opening through which tap led from said roll exits said container, said container also having a cutting edge against which the connecting strips between the segments of said tape may be severed, and, c. a filler member comprising a thin sheet of resiliently flexible material mounted in said container, the plane of said sheet extending the full length of said paper roll and being parallel with but spaced from said roll, and having a cross-section contour including a smoothly curved portion bounding said exit opening and extending away from said opening toward the interior of said container, over the convex side of which paper leaving said roll must pass, and an extension projecting interiorly into said container and operable by its resilience to engage and press said roll against an opposite wall of said container, whereby to apply a braking force resisting rotation of said roll within said container.

* * * * *